March 10, 1953  C. R. CURTIS  2,630,997
FILLING MACHINE
Filed Oct. 12, 1946  3 Sheets-Sheet 1

Inventor:
Clarence R. Curtis
By
Stone, Artman & Biegen
Attys.

March 10, 1953  C. R. CURTIS  2,630,997
FILLING MACHINE
Filed Oct. 12, 1946  3 Sheets-Sheet 2

Inventor.
Clarence R. Curtis
By
Attys.

March 10, 1953  C. R. CURTIS  2,630,997
FILLING MACHINE
Filed Oct. 12, 1946  3 Sheets-Sheet 3

Inventor:
Clarence R. Curtis
By
Stone, Altman & Bisson
Attys.

Patented Mar. 10, 1953

2,630,997

UNITED STATES PATENT OFFICE 2,630,997

FILLING MACHINE

Clarence R. Curtis, Lombard, Ill.

Application October 12, 1946, Serial No. 702,913

14 Claims. (Cl. 249—18)

This invention relates to a method of packaging bulk material of the type which is solid but flowable, and to a machine for practicing the method.

The specific embodiment of the invention shown in this application relates to a method of packaging desiccated foods such as soup base but is is broadly applicable to packaging any type of a flowable material.

Under one type of present practice, food packages are each weighed as filled in order to assure compliance with the narrow limit of error in weight imposed by State and Federal laws. This weighing step constitutes a serious time-consuming factor in packaging. Other devices avoid this step by filling a volume which previous tests with the same material have shown weighed out approximately to the amount to be placed in a selected container and then emptying this volume into the container. Complicated machines employing this principle are in use.

The present invention is based on this simple thought: a quantity of material sufficient to fill a plurality of containers, as for example six, is measured out by weight; and then this quantity is divided volumetrically into six equal parts, which are then dropped into six containers. This being the general principle, the general object of this invention may be said to be to eliminate a large number of weighing steps by weighing out a large quantity of material and of then accurately dividing that quantity into equal volumetric portions.

In the machine shown in the drawings, the first step is the weighing out of three pounds of desiccated soup base. The second step is to equally distribute this quantity into six equal size openings, this being done centrifugally. The third step is to deliver the quantity received by each opening to one of the containers so that six containers each get exactly one-half pound of the desiccated soup base.

At the present time, it is anticipated that the method of dividing a given weight into equal portions will satisfy the trade, for under present practice the containers, particularly is this true of bottles, are shipped by the bottle manufacturer in a carton, the bottles in any given carton being of equal size. In order to avoid repackaging, applicant's machines will fill the bottles without taking them out of the package. It is anticipated, however, that food manufacurers having a demand for various sizes as for example, a one-half-pound and a one-pound bottle of powdered milk, may develop a shipping unit having sizes therein. Under such circumstances, applicant's machine would have to produce different ultimate weights and as will be made clear in the accompanying specification, this is easily accomplished. Thus, where a manufacturer gets up a shipping unit composed of sixteen one-half-pound jars and two one-pound jars, applicant's machine will weigh out ten pounds of material and then produce sixteen equal quantities of one-half pound each and two equal quantities of one pound each.

In carrying out the general purposes of this invention, applicant has certain specific objectives. Under some circumstances, it is desirable to prevent the flow of material to be distributed through the apparatus even though the material has been dropped into the hopper. Applicant so relates the delivery opening to the centrifugal apportioning means that the material will pile up on the centrifuge when the latter is not turning without overflowing into the apportioning means.

Another object of the invention is to empty a weighing hopper into a main hopper of the machine with sufficient suddenness so that the weighing hopper will be quickly emptied and returned to normal position so that it may be refilled during the apportioning operation of the machine and be in readiness for the next cycle of the machine.

Additional applicant provides for agitating the material in the delivery channel of the hopper by agitators mounted on the centrifuge. In one embodiment of the invention, means are positioned for accurately centering the outlet of the principal hopper over the centrifuge.

Still further objects and aspects of novelty and utility inherent in the invention, will appear as the following description proceeds in view of the annexed drawings in which.

Figure 1:
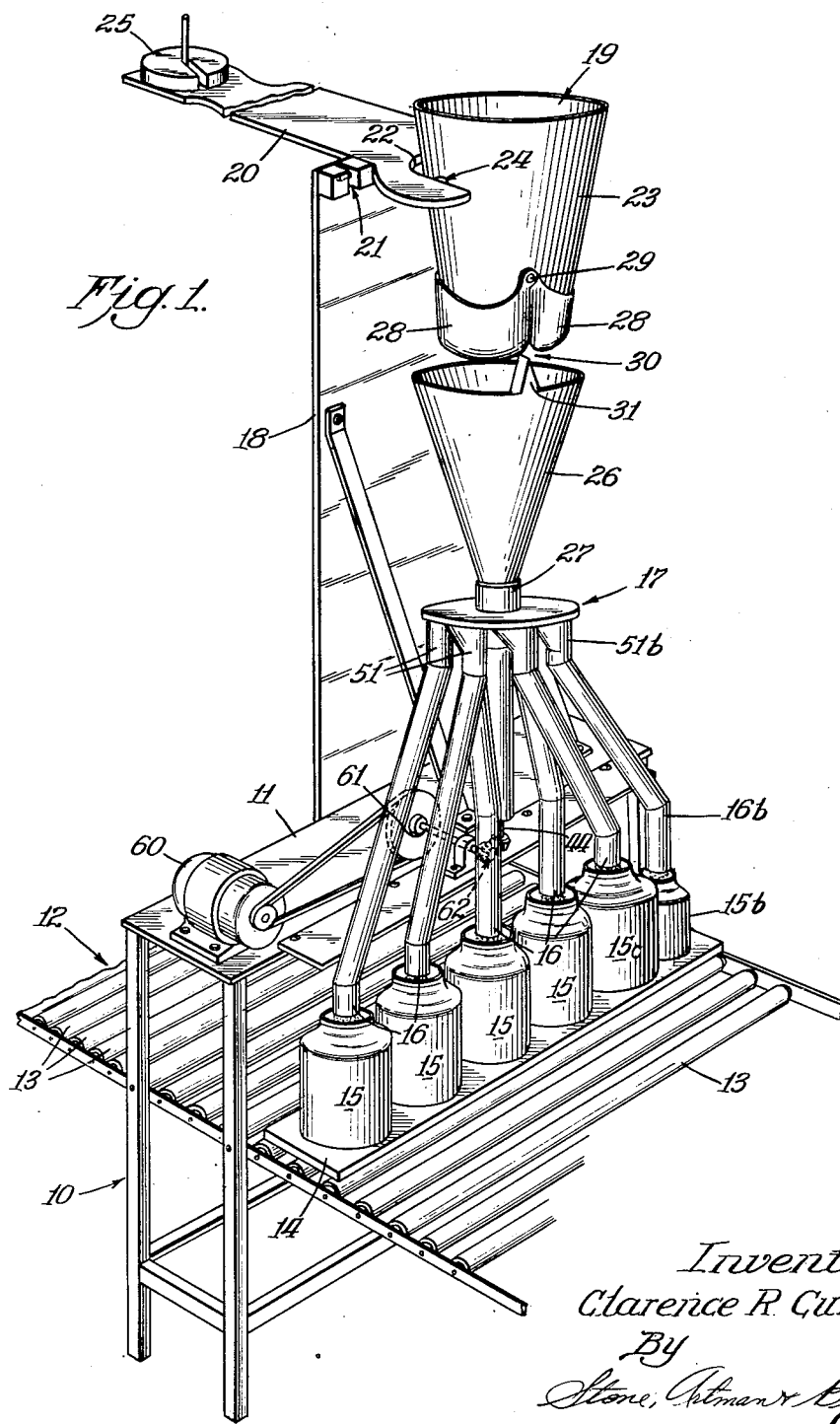
Fig. 1 is a perspective view of one preferred form of packaging machine embodying the principles of the invention.

In a preferred form of construction shown in Fig. 1, the novel packaging machine consists of a frame 10 surmounted by a shelf 11, beneath which is a rollway 12 including a plurality of parallel rollers 13 providing a conveying table of known type, upon which a container support or plate 14, carrying aligned packaging receptacles, in this case jars 15, is positioned beneath discharge or filler spouts 16 of the weight-by-volume mechanism 17 situated thereabove.

Secured to the frame and shelf structure aforesaid, is an upright plate 18 at the top of which is a counterpoised loader generally indicated at 19 and consisting of a balance arm 20 rockably mounted, as at 21, on plate 18 and having a yoke 22 pivotally supporting a loading hopper or container 23 as at 24, while the opposite end of said balance arm is provided with counterbalancing weight means 25.

The bottom of the loading hopper or bucket 23 overlies the mouth of a funnel shaped feeding hopper or receiver 26, the lower end of which is fitted into the throat 27 of the weight-by-volume mechanism, said lower end of the loader 23 being provided with a clam-shell type closure means including a pair of jaws 28 pivoted on the loader as at 29 in a normally closed condition so that the loader may be filled from the bulk supply of the material to be weighed.

The loader of weighing hopper 23, being counterbalanced by weight means 25 of predetermined weight value, rests in the position shown in Fig. 1 during the loading or filling operation, until a weight of material is received in the loading hopper 23 sufficient to over-balance the weight means 25, whereupon the balance arm 20 rocks clockwise and the loading hopper 23 descends toward the feeding hopper 26 until the cammed tripping formations 30 on the clamshell closures engage a tripping projection 31 on the upper edge of the feeding hopper, thereby spreading the clamshells and discharging the weighed load into hopper 26 automatically.

In accordance with the foregoing structural arrangement, it is an operative feature of the novel method and means of packaging that a predetermined weight of the material to be packaged is first measured out or segregated from the bulk supply and loaded into the machine, the preferred embodiment shown effectuating the loading automatically as a function of the initial weighing operation by which the loading hopper 23 is filled.

Figure 3:
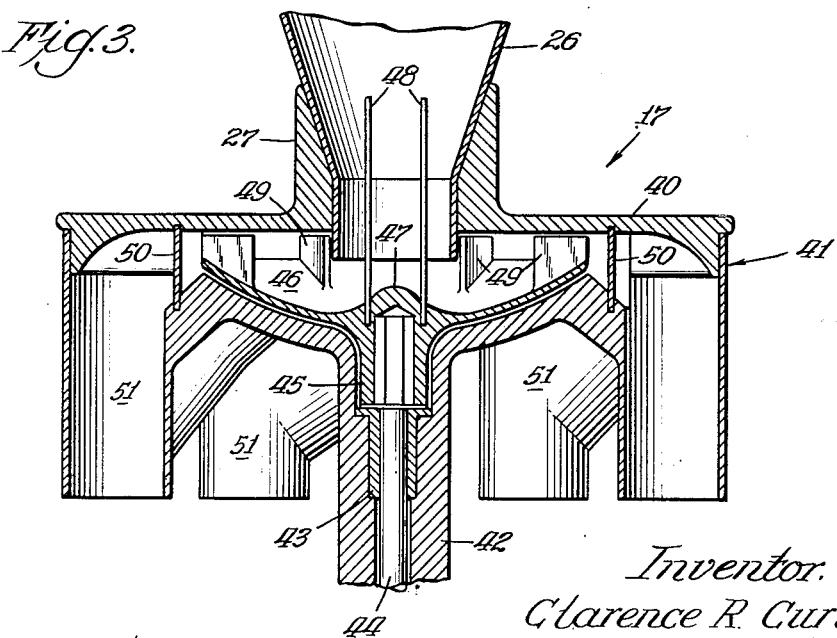
Fig. 3 is a vertical fragmentary section taken along lines 3—3 of Fig. 2.

The novel weight-by-volume means 17 will apportion the predetermined weight of material weighed into the feeding hopper as aforesaid, with a high degree of accuracy in any desired ratio of weights or volumes in the containers or jars 15 by reason of the particular constructions shown in Fig. 3, showing in vertical section certain elements of the novel weight-by-volume mechanism 17, including an annular top plate 40 of which the throat 27 for the feeding hopper is a part.

Fitted onto the rim of plate 40 is a casting 41 including a central depending member 42 bored internally to receive a bushing 43 for a rotor shaft 44 keyed into the boss 45 of a centrifuge rotor 46 of substantially concave shape.

Rotor 46 has an accurately centered protuberance 47 disposed to lie beneath the central portion of the lower end of the feeding hopper 26 in throat 27, the arrangement being such that the axis of rotation of shaft 44 and rotor 46 is coincident with the center of the protuberance 47 and the center of the feeding hopper 26, particularly the lower end portion of the latter, in order to insure accurate distribution of the weighed material to the centrifugating means, and to this same end there are provided a pair of agitating members or rods 48 fitted into the rotor on diametrically opposite sides of the axis of rotation and protuberance 47, said rods projecting upwardly into the lower end of the feeding hopper 26 and effecting agitation of the weighed material in this region therein so that the downfeed is constant and uniform to the central portion of the rotor.

Disposed at intervals around the peripheral portions of said rotor are radial vanes 49 (see also Fig. 2) cofunctioning with certain isolating or diverting vanes or deflectors 50 in casting 41 to distribute the weighed volume from hopper 26 into the open upper end portions or mouths 51 of the filler spouts or tubes 16 formed in casting 41.

Figure 2:
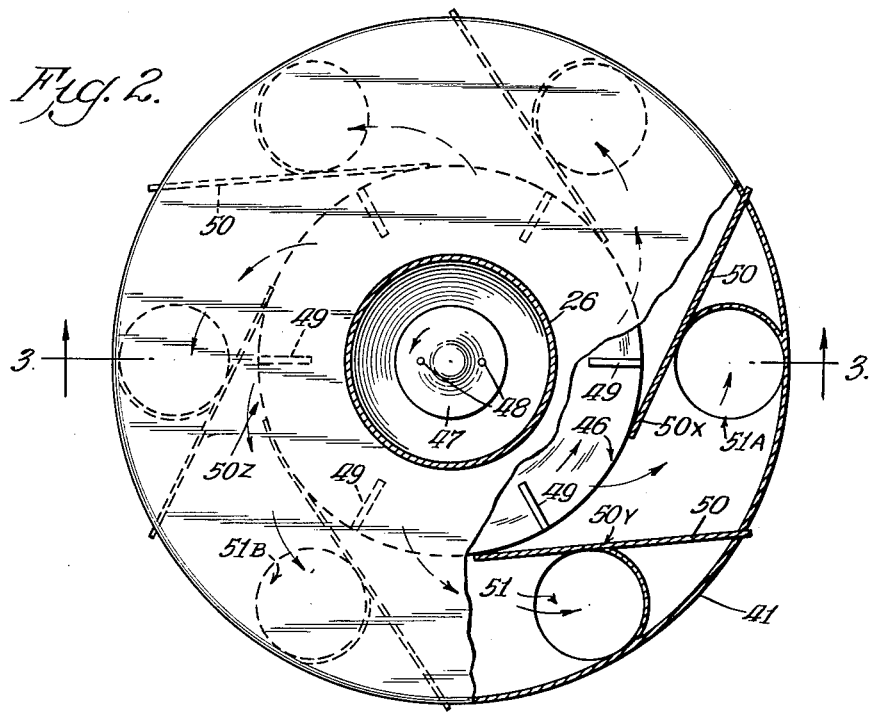
Fig. 2 is a horizontal cross section, to enlarged scale, and with parts shown in plan, taken through the centrifugal distributing means.

As will appear from inspection of Fig. 2, the apportioning vanes 50 extend in approximate tangency to the periphery of rotor 46, but lie in intersecting planes relative to each other, so that the edge portion 50X of one vane is spaced a certain (and critical) distance from a near median region 50Y of the preceding vane, having regard to the indicated direction of rotation of the rotator in Fig. 2, it being an important feature of the invention that said critical spacing of vane portion 50X from portion 50Y of a preceding vane constitutes a determinant for the control of volume of material which shall be distributed into the mouth 51A of the filler spout associated with said pair of vanes involving portions 50X and 50Y.

Thus, in Fig. 2, it will be observed that the critical vane spacing at 50Z at the left of this view affords an entrance or distributing passage of critical cross-sectional area for the weighed material, which is only about half the extent of the area of any remaining passage, by reason of which the volume of weighed material which will be distributed to the mouth portion 51B of the corresponding filler tube 16B, will be only one-half the volume distributed to spout or tube 51 which in turn will be one-third greater than the remaining tubes. Accordingly, the packaging container or jar 15b in Fig. 1 is shown to be only half the size of the adjacent jar 15C, which is slightly larger than the other jars.

Means for driving the rotor 46 includes (Fig. 1) motor 60 having belt drive connection with a countershaft 61 from which the rotor shaft 44 is driven through bevel gears 62.

In the operation of the device, a predetermined weight of the material to be packaged, whether it be granular, flaky, powdery or otherwise particulated, is loaded into the hopper 23, the desired weight 25 having been first positioned on balance arm 20; and when the corresponding weight-volume of bulk material has been deposited in hopper 23, the latter, by over-balancing weight 25, will descend and trip the clamshell bottom closures 28 on cam means 30, 31, thereby depositing the predetermined load in the feeding hopper 26.

The appropriate number and size of packaging containers or jars 15, 15B having been positioned in filling relation with spouts 16, 16B, motor 60 is started, causing rapid rotation of the rotor 46, and the bulk material feeds downwardly (Fig. 3) through the lower end of hopper 26 in throat 27 onto the central protuberating portion 47 of the rotor with the agitating assistance of rod means 43 eccentrically rotated with the centrifuge or rotor member 46.

As a result of centrifugal forces acting on the bulk material descending onto the central portion of the rotor, said material tends to move rapidly out toward the periphery of the rotor in a linear or radial sense in between adjacent peripheral rotor vanes 49, said rotor being dished or concaved to further effect a collecting of the bulk material quickly in substantially uniform volumes in peripheral regions between vanes 49, so that the latter may impart substantial angular velocity to the material, impelling it to fly off into space toward the isolating or apportioning openings between adjacent vanes 50, as heretofore especially pointed out, whereby such material may move into the corresponding filler tubes or spout portions for delivery into the corresponding jar or packaging receptacle.

The volumetric apportionment of the bulk material to the several packaging receptacles is highly accurate for a great variety of particulated or comminuted substances, and the device has been successfully employed, for example, in the packaging of certain foodstuffs, such as dehydrated vegetables, and dehydrated soups containing a variety of vegetable particles of different structural and mass constituency, such as celery and diced carrots, all of which have presented one or another kind of difficulty in attempts to package them economically by prior methods, it being especially noteworthy in this connection that in accordance with the methods and means of this invention, the fact that the bulk supply may not be homogeneous in any strict sense does not materially interfere with the relatively accurate and uniform distribution of particles of different shape and constituency, for instance, provided there is a substantially uniform distribution of the various particles in the original charge or load of the bulk material when it is deposited in the feeding hopper 26.

Centrifugal machines have been used heretofore for separating and grading materials of different mass, and for distributing particles according to mass, or for separating solids from liquids or liquids from other liquids; but all such prior devices have operated on well-known laws of centrifugal action in which mass and velocity are the controlling factors; while the method and means of the present invention introduces the use of apportioning means, and rotating periphery elements concentric with the centrifuge for segregating a plurality of either equal or determinantly proportioned volumes of the bulk charge or load and guiding these volumes into packaging receptacles, it being now apparent that since the delivered volumes are constant and predictably accurate for a given setting of the machine (as to the relative proportions to be delivered by each spout, for example), and since the machine is initially charged with a known weight of bulk material, the relative weight-volumes delivered to the several package containers are predetermined; and this capability of the machine is as a practical matter, unaffected by charging it with a mixed load so long as the charge is itself suitably mixed before starting the machine, for it is known that if the initial charge contains several kinds, shapes, or sizes of particle, and these particles are fairly well intermixed and distributed in the initial charge, substantially the same relative distribution and intermixing of the particles will be present in the several delivered volumes.

Figure 4:
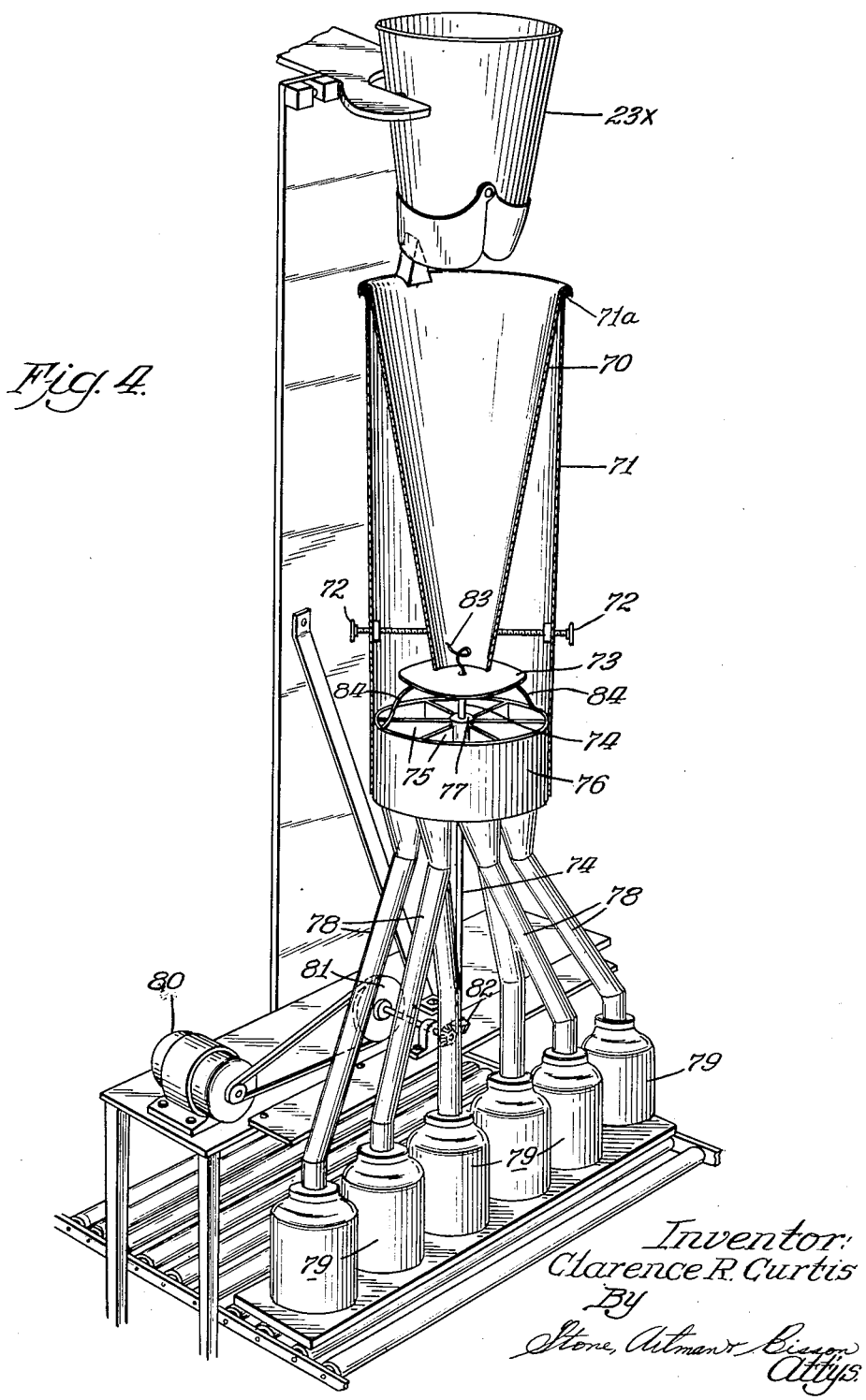
Fig. 4 is a perspective view of a modified form of packaging machine, with parts shown in section.

It is possible to procure a degree of accuracy and speed, comparable to that afforded by the embodiment just described, by a modified form of the device such as exemplified in Fig. 4, wherein there is provided the identical weighing-loading means 23X heretofore described in view of Fig. 1, the same discharging in identical manner into a feeding and distributing hopper 70 of conical shape and disposed within a supporting and shielding member 71 so as to be movable in a lateral sense in the latter, this conical member having for this purpose a flange portion 71A at its upper edge engaging the upper rim portion of the shield member 71 so that the lower discharge end portion 70B of the conical feeding hopper may be centered exactly by manipulation of centering screws 72, of which there are at least three, spaced equidistantly about the shield 71.

Centrifugal distributing means in the form of disc 73, rotatable at the upper end of shaft 74, is disposed concentrically of feeding hopper 70 and a collecting or apportioning means, which includes a plurality of partitioning vanes 75 arranged radially of shaft 74 in casting 76, the hub portion 77 of which provides a bearing for shaft 74; said vanes thus divide the annular space of casting 76 into concentric chambers open at their upper faces, their respective lower portions opening into corresponding delivery tubes 78 arranged to discharge into packaging containers 79, as in the embodiment of Fig. 1.

The aforesaid centrifugal distributing means is driven by motor means 80, pulley means 81 and bevel gears 82, the distributing plate or disc itself being provided with agitating means 83 in the form of an eccentrically twisted wire rod functioning analogously to the means 48 of Fig. 1.

Extending from the under side of disc 73 to points adjacent the upper surface of the apportioning means 76 are wipers 84 which keep in motion the particulated matter so that it cannot become packed in this space.

In the operation of the modified form of packaging machine, a predetermined weight of the substance to be packaged is first weighed out in the loading receptacle 23X, which automatically dumps its charge into the feeding hopper 70, the latter having first been very carefully centered with respect to the rotational center of disc 84, by adjustment of screws 72; and a number of containers or jars 79 adequate to receive the predetermined weight-volume of the substance weighed into the feeding hopper as aforesaid, are disposed beneath the discharge ends of the filling tubes 78.

With motor 80 in operation, the disc 73 rotates at high speed and centrifugally sprays or throws the particulated substance received from hopper 70 outwardly from rim thereof for movement downwardly into the chambers defined by vanes 75, it being noted that adequate space is provided between the periphery of said disc and the surrounding shield member 71 to assure complete freedom of the particles in this movement, the projections 84 assisting in this connection, so that the particulated substance is distributed equally in said space, such that if the said chambers are of the same size and the upper openings thereto are of the same area, identical volumes (with correspondingly identical weights) will be delivered into containers 79.

By changing the spacing of vanes or partitioning means 75, so that the mouth or entrance portions thereof below disc 73 are of different angular cross sectional area, there will be a corresponding difference in the apportionments of the material being packaged, analogously to the arrangement of Fig. 1 so that the modified form of the device is also capable of distributing a predetermined weight-volume of particulated or divided matter in any desired apportionments amongst a plurality of packaging containers or other receptacles the aggregate volume of which is sufficient to receive the volume of the initially weighed charge or load.

Both embodiments of this invention have been illustrated by machines employing the principle of centrifugally ejecting the material of an apportioning wheel. While this is considered to be the preferred design, at the time, it is by no means the only way of practicing applicant's invention. Thus, a weighed-out mass might be slowly introduced into a wind tunnel which would blow the material against an apportioning wheel so as to evenly distribute it. Again, applicant has designed a hopper having a bottom spout which as it empties will move around an apportioning wheel such as 76 in Fig. 4 at a constant rate of speed so as to distribute in the course of emptying itself substantially equal quantities in each spout. In applicant's invention, the bulk material moves in a steady stream of fairly uniform cross section into a distributive area at a rate of speed such that the amount delivered to each area at one time will constitute a comparatively minute fraction of the mass that is to be divided.

The process may be described as weight packaging by volumetric division of selected weight of material.

I claim:

1. A packaging machine for introducing concurrently exact selected weights of particulated material to a selected number of containers comprising in combination a weighing hopper having a capacity equal to the gross weight of the material to be placed in the containers, a feeding hopper positioned to receive such a charge from the weighing hopper, means for automatically emptying the weighing hopper into the feeding hopper when the requisite gross weight of material is in the weighing hopper, centrifugal distributing means receiving exactly over its center the charge from the feeding hopper, a plurality of apportioning chambers having inlets disposed peripherally of said distributing means, and open package filling ducts leading from said chambers.

2. A packaging machine comprising a rockable weighing hopper, weight means normally counter-balancing said weighing hopper, a feeding hopper in alignment with said weighing hopper to receive a charge therefrom, means normally closing the weighing hopper in counterbalanced condition, means cooperable on said hoppers responsive to rocking movement of the weighing hopper when the latter has received a predetermined weight over-balancing said counterbalancing means to open said closure means and effect discharge of the contents of the weighing hopper into the feeding hopper, together with centrifugal distributing means receiving the charge from the feeding hopper, and a plurality of apportioning chambers disposed to receive portions of the charge from the centrifugal means, and means for conducting the contents of said chambers to containers.

3. Mechanism for packing particulated matter comprising a centrifugal distributor rotating in a substantially horizontal plane, a plurality of apportioning chambers situated concentrically of said distributor, means for conducting the contents of each of said chambers to a package container, means for rotating said distributor, means for delivering particulated matter exactly over the center of said distributor, and means for receiving a predetermined weight-volume of particulated matter and automatically discharging the same into said delivering means.

4. Apparatus for packaging a selected weight of pulverulent, flocculated, and analogously particulated substantances in a selected number of containers comprising, in combination, a loading hopper and counter-weight means rockable from a normal loading position to a discharge position responsive to deposit in said hopper of the gross weight of said matter to be placed in all of said containers, feeding means receiving said meter gravitationally from said loading hopper, a centrifugal distributor receiving said matter gravitationally and exactly over the center of the rotational axis of said distributing means, apportioning chambers situated to receive matter centrifugated from said distributor means, and means for conveying centrifugated matter from each said chamber to a packaging container.

5. In a packaging machine of the class described, the combination, with a round centrifugal distributor rotating in a horizontal plane, of volume determining means comprising a plurality of apportioning chambers situated concentrically of said distributor in fixed position, each said chamber having an entrance opening facing the centrifugal distributor and having a predetermined cross-sectional area and including a deflector tangential to the periphery of the rotor, means for conveying the contents of each chamber to a package container, the volume of centrifugated matter delivered to a container from any said chamber being proportionate to the cross-sectional area of the entrance portion thereof, and means for feeding onto the exact center of said distributor the exact predetermined weight-volume of bulk matter to the same number of containers as there are apportioning chambers, the aggregate volume of said containers being not less than said predetermined weight-volume.

6. A filling machine comprising a concave rotor mounted to rotate in a substantially horizontal plane, and means for driving said rotor, a plurality of deflector vanes situated in approximately vertical planes and tangentially of said rotor, said vanes comprising in pairs chambers receiving divided matter centrifugated from said rotor, means for conducting the contents of said chambers to containers to be filled, an upright feeding chamber concentrically situated relative to said rotor and from which divided matter gravitates onto the central portions of the rotor, eccentric agitating means projecting from the rotor into the feeding chamber, and means for dumping determined weights of divided matter into said feeding chamber automatically responsive to deposit in said last mentioned means of the determined weight of matter aforesaid from a bulk supply.

7. A packaging machine comprising a centrifugal rotor mounted to rotate in an approximately horizontal plane, means for rotating said rotor, an enclosure for said rotor providing bearing support for the latter, apportioning chambers formed in said enclosure and each having an inlet of critically predetermined cross-sectional area and a discharge tube for conducting the contents thereof gravitationally to a container to be filled, peripheral particle-impellers on said rotor, an upright feeding hopper discharging bulk matter centrally onto said rotor, a loading hopper for receiving predetermined weights of particulated bulk matter, a counterbalance arm mounting said loading hopper to rock downwardly toward and in alignment with said feeding hopper, means receiving counterweights of desired value on said arm on the side of the rocking axis thereof remote from the loading hopper, a given counterweight maintaining said loading hopper in normally raised loading position until the counterbalancing effort thereof is overbalanced by loading of a corresponding weight of bulk matter in the loading hopper, closure means normally closing the bottom portion of said loading hopper, and coacting means on said hoppers for opening said closure means when the loading hopper rocks a determined distance toward said feeding hopper from normal loading position, whereby to automatically discharge the predetermined weight of bulk matter from the loading into the feeding hopper.

8. In a packaging machine for substances in divided state including granulated, flocculated, pulverulent and analogously discrete condition, the combination with a centrifuge having a vertical axis onto which said matter is fed on the exact center of said centrifuge, of apportioning means including a plurality of chambers disposed in regions peripheral to the centrifuge and each having an entrance opening of predetermined cross sectional area through which the centrifugated substance enters said chambers, means for guiding the contents of each chamber to a packaging container, and means for feeding predetermined weight-volumes of divided matter to the centrifuge in amount equivalent to the aggregate volumetric capacity of said containers filled from the apportioning chambers as aforesaid during any given packaging operation of said machine.

9. In a packaging machine of the class described, the combination with an annular centrifuge rotating in a substantially horizontal plane, of apportioning means comprising chambers situated in peripheral regions concentrically of the axis of rotation of said centrifuge, a vertical feeding hopper disposed to feed discrete material gravitationally onto the exact center of said centrifuge, means rotatable eccentrically with the centrifuge for agitating matter in said hopper, agitating and particle moving means situated in peripheral regions of the centrifuge and moving therewith in the path of particles centrifugated into said chambers, means feeding the contents of each chamber into a packaging container to be filled, and means for loading a predetermined weight and volume of discrete material from bulk supply into said feeding hopper.

10. In a packaging machine of the class described, a weighing hopper having a capacity sufficient to receive a charge of particulated matter equaling the gross weight to be placed in a selected number of containers, a centrifugal rotor of concave shape positioned to receive the contents of the weighing hopper on the exact center of its axis, means for rotating the rotor, an enclosure for said rotor, chambers formed in said enclosure and each having an entrance portion of critical cross-sectional area situated to receive centrifugated matter from said rotor and each having an exit from which the contents thereof is discharged to a container to be filled, radial vanes situated in peripheral regions of said rotor for imparting angular impetus to centrifugated particles directed toward said entrance portions, and means for loading a predetermined weight of bulk particulated matter and feeding the same centrally onto said rotor.

11. In a packaging machine, a weighing hopper having a capacity sufficient to receive a charge of particulated matter equaling the gross weight to be placed in a selected number of containers, a rotor for centrifugally distributing particulated matter positioned to receive the contents of the weighing hopper concentrically of its axis, an enclosure for said rotor, apportioning vanes disposed concentrically of the rotor in relatively intersecting planes which are tangential to the rotor orbit and parallel to the rotational axis of the rotor, adjacent vanes in pairs defining respectively an apportioning chamber, the end portions of said adjacent vanes nearest said orbit defining the entrance to the corresponding chambers, the spacing between said end portions defining a controlling cross-sectional area for the corresponding entrance such that for a given volume of matter centrifugated from said rotor, each chamber will receive an apportioned fraction of said given volume which is always substantially proportional to the corresponding cross-sectional area of the entrance thereto, and means for discharging the chamber contents in package receptacles.

12. In a packaging machine of the class described, a weighing hopper having a capacity sufficient to receive a charge of particulated matter equaling the gross weight to be placed in a selected number of containers, a rotor for centrifugally spraying particulated matter outwardly of the orbit thereof positioned to receive the contents of the weighing hopper on the exact center of its axis, means responsive to a selected quantity of material in the weighing hopper for discharging the weighing hopper concentrically onto said rotor, an enclosure for said rotor, means forming apportioning chambers in said enclosure situated concentrically of the rotational axis of the rotor, each chamber having an entrance of predetermined cross-sectional area and an exit leading to a package filling terminus, a feeding device having an upper portion mounted movable about said rotor, and a lower discharge portion situated movably above the rotational center of the rotor, means for adjustably setting the said lower portion of the feeding device in desired positions of the relative concentricity with the rotor, means for driving the rotor, and agitating means movable with said rotor.

13. A packaging machine for introducing concurrently exact selected weights of particulated material to a selected number of containers comprising in combination a weighing hopper having a capacity equal to the gross weight of the material to be placed in the containers, centrifugal distributing means rotating on a vertical axis positioned to receive on the exact center of its axis the charge from the weighing hopper, means for automatically emptying the weighing hopper onto the distributing means when the requisite gross weight of material is in the weighing hopper, a plurality of apportioning chambers having inlets disposed peripherally of said distributing means, and a filling station for holding one of the selected number of containers positioned to receive the material from each apportioning chamber.

14. A packaging machine for introducing concurrently exact but different selected weights to a number of containers comprising in combination a weighing hopper having a capacity equal to the gross weight of the material to be placed in the containers, a feeding hopper positioned to receive such a charge from the weighing hopper, means for automatically emptying the weighing hopper onto the distributing means when the requisite gross weight of material is in the weighing hopper, centrifugal distributing means rotating about a vertical axis positioned to receive on the exact center of its axis the charge from the feeding hopper, a plurality of apportioning chambers having inlets disposed peripherally of said distributing means, said apportioning chambers having openings each of which bear the same proportion to the total openings as the selected weight for a container bears to the gross weight to be placed in all of the containers, and a filling station for holding a container associated with each apportioning chamber, whereby a large container may be placed at a filling station associated with an apportioning chamber having a large opening toward the distributing means and a smaller container may be positioned in a filling station associated with an apportioning chamber having a smaller opening directed toward the distributing means.

CLARENCE R. CURTIS.

REFERENCES CITED

The following references are of record in the file of this patent:

UNITED STATES PATENTS

| Number | Name | Date |
|---|---|---|
| 518,915 | Clarkson | Apr. 24, 1894 |
| 570,109 | Smyser | Oct. 27, 1896 |
| 640,626 | Braun | Jan. 2, 1900 |
| 679,968 | Inman | Aug. 6, 1901 |
| 769,909 | Livingston | Sept. 13, 1904 |
| 783,405 | Darvas | Feb. 21, 1905 |
| 797,144 | Nickerson | Aug. 15, 1905 |
| 850,293 | Calkins | Apr. 16, 1907 |
| 882,926 | Boynton | Mar. 24, 1908 |
| 920,597 | Mallett | May 4, 1909 |
| 966,885 | Bond | Aug. 6, 1910 |
| 1,306,052 | Edtbauer | June 10, 1919 |
| 1,348,885 | Laffoon | Aug. 10, 1920 |
| 1,517,509 | Hokanson | Dec. 15, 1924 |
| 1,926,802 | Currier | Sept. 12, 1933 |
| 1,953,928 | Colver | Apr. 10, 1934 |
| 2,048,124 | Hume | July 21, 1936 |